(12) United States Patent
Manthei

(10) Patent No.: US 6,202,831 B1
(45) Date of Patent: Mar. 20, 2001

(54) WORK STATION FEEDING DEVICE

(75) Inventor: Uwe Manthei, Binzen (DE)

(73) Assignee: Wampfler Aktiengesellschaft, Weil am Rhein-Maerkt ( * ) Notice: Subject to any disclaimer, the term of this patent is extended or adjusted under 35 U.S.C. 154(b) by 0 days.

(21) Appl. No.: 09/307,550

(22) Filed: May 7, 1999

(30) Foreign Application Priority Data

Feb. 9, 1999 (DE) ............................................. 199 05 336

(51) Int. Cl.$^7$ .................................................. B65G 37/00
(52) U.S. Cl. ............................................ 198/602; 414/918
(58) Field of Search ................................... 414/918, 248, 414/91; 212/341; 254/360, 329

(56) References Cited

U.S. PATENT DOCUMENTS

| 637,333 | * | 11/1899 | Halsey . | |
|---|---|---|---|---|
| 886,012 | * | 4/1908 | Paul . | |
| 2,574,131 | * | 11/1951 | Steinbrecher . | |
| 2,617,548 | * | 11/1952 | Falkner . | |
| 4,470,229 | * | 9/1984 | Muse et al. | 52/118 |
| 4,482,133 | * | 11/1984 | Bishop | 254/291 |
| 4,648,777 | * | 3/1987 | Eichenauer | 414/591 |
| 4,691,806 | * | 9/1987 | Jansen et al. | 187/227 |
| 4,809,472 | * | 3/1989 | Hade, Jr. et al. | 52/118 |
| 4,838,492 | * | 6/1989 | Berry | 239/752 |
| 4,913,613 | * | 4/1990 | Hirschmann | 414/751 |
| 5,339,866 | * | 8/1994 | Holt | 138/111 |
| 5,361,565 | * | 11/1994 | Bayer | 254/292 |
| 5,611,522 | * | 3/1997 | Zaguroli, Jr. | 254/331 |
| 5,692,984 | * | 12/1997 | Kayatani et al. | 474/205 |
| 5,746,396 | * | 5/1998 | Thorton-Trump | 244/134 R |
| 5,813,286 | * | 9/1998 | Hansen | 74/490.02 |

FOREIGN PATENT DOCUMENTS

| 15 021 | 7/1897 | (CH) . |
|---|---|---|
| 296 07 228 | 6/1996 | (DE) . |
| 1 345 760 | 11/1962 | (FR) . |
| 1 037 489 | 7/1966 | (GB) . |

* cited by examiner

*Primary Examiner*—Kenneth W. Noland
(74) *Attorney, Agent, or Firm*—Flynn, Thiel, Boutell & Tanis, P.C.

(57) ABSTRACT

A work station feeding module with a rail includes a carriage guided thereon and movable along the rail. The work station feeding module includes at least one supply line guided in a flexible energy supply chain arranged within the rail. One end of the flexible energy supply chain is fixed with respect to the rail and the other end is fastened on the carriage. Such work station feeding modules have the disadvantage that only electric lines can be guided in such modules and additional feeding devices must be provided for other energy carriers or raw materials. The work station feeding module enables a simpler and more compact feeding of the work station and guarantees that at least one of the supply lines is a compressed-air line. A compressed-air outlet connection is provided on the carriage. The module has a continuous compressed-air channel in its longitudinal direction that is connected to the rail-fixed end of the compressed-air line through an output branch.

20 Claims, 3 Drawing Sheets

US 6,202,831 B1

WORK STATION FEEDING DEVICE

FIELD OF THE INVENTION

The invention relates to a work station feeding module including a rail, a carriage movably mounted to the rail, and at least one supply line secured to the rail and the carriage and to a work station feeding device, which includes several such modules.

BACKGROUND OF THE INVENTION

Work station feeding devices are known, which have a rail and longitudinally movable carriage guided in the rail, whereby the rail, as a rule, has mounting elements, with which the rail can be fastened either on the ceiling or on support beams. The rail has an essentially C-shaped cross section, whereby the under side of the rail is slotted therealong. The carriage is guided within the rail and usually has for this purpose two undercarriages, which can roll on the interior surface of the under side of the rail. A beam projects from each of these undercarriages downwardly out of the slot of the rail, and the actual carriage is suspended on beams. Thus, the carriage can be moved along the rail. One or several electric lines exist within the rail, which electric lines can be designed as high-voltage or low-voltage lines and can also include lines for data transmission. The electric lines are introduced at one supply point into the interior of the rail. However, the electric lines are not directly fed to the carriage since moving the carriage could result in bending of the supply lines. Therefore, the electric lines run at least in a portion of the rail within a flexible energy chain. One end of this flexible energy chain is fixed with respect to the rail and the other end is fixed on the rail or on one undercarriage in the rail. The flexible energy chain, also known as a guide track (worm), has an upper strand of chain and a lower strand of chain, which extend parallel to one another, whereby the upper strand of chain extends near the upper side of the rail and the lower strand of chain extends near the under side of the rail and rests on this under side. The transition from the upper to the lower strand of chain is accomplished by a 180° bend of the chain. The open ends of the chain are fixed within the rail or on the carriage.

The supply lines fed to the interior of the rail extend initially without any further guide in the rail and can be additionally secured in the rail. They then enter into the inside of the flexible energy chain and extend initially through the upper strand of chain, then through the 180° bend, and thereafter through the lower strand of chain, which ends at the undercarriage of the carriage. The lines are then fed to the actual carriage projecting from the rail, where sockets or other connectors are provided.

It is disadvantageous in such work station feeding devices that only electric lines can be guided therein and additional feeding devices for other energy carriers or raw materials must be provided.

Therefore, the purpose exists to further develop a work station feeding module so that a simpler and more compact feeding of material to the work station is guaranteed.

This purpose is attained with the characterizing characteristics disclosed herein. Advantageous further developments are also disclosed.

BRIEF DESCRIPTION OF THE DRAWINGS

One exemplary embodiment of the invention will be discussed in greater detail hereinafter with reference to the accompanying drawings, in which.

DETAILED DESCRIPTION

Figure 1:
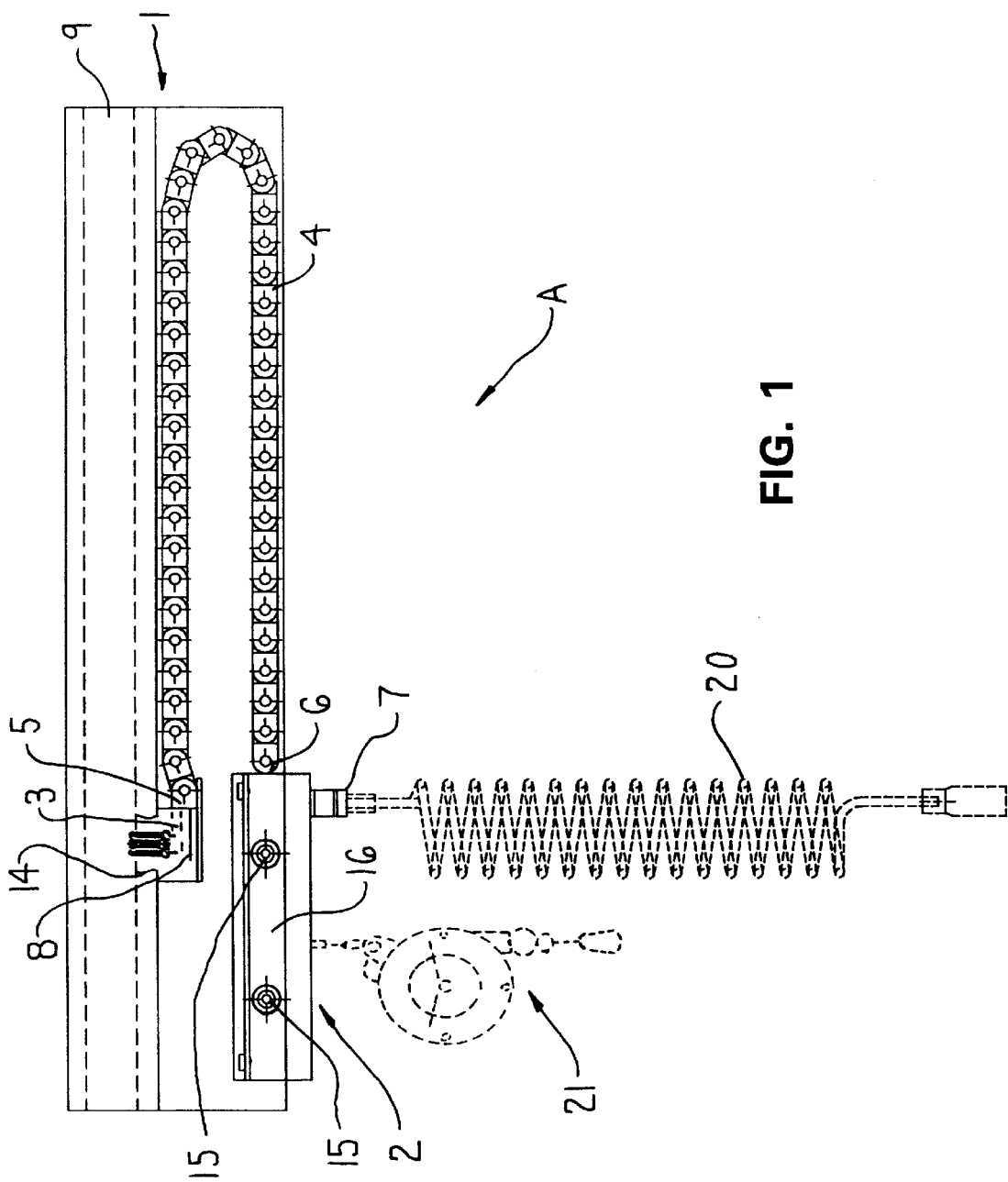
FIG. 1 is a longitudinal cross-sectional view of a work station feeding module of the invention.
Figure 3:
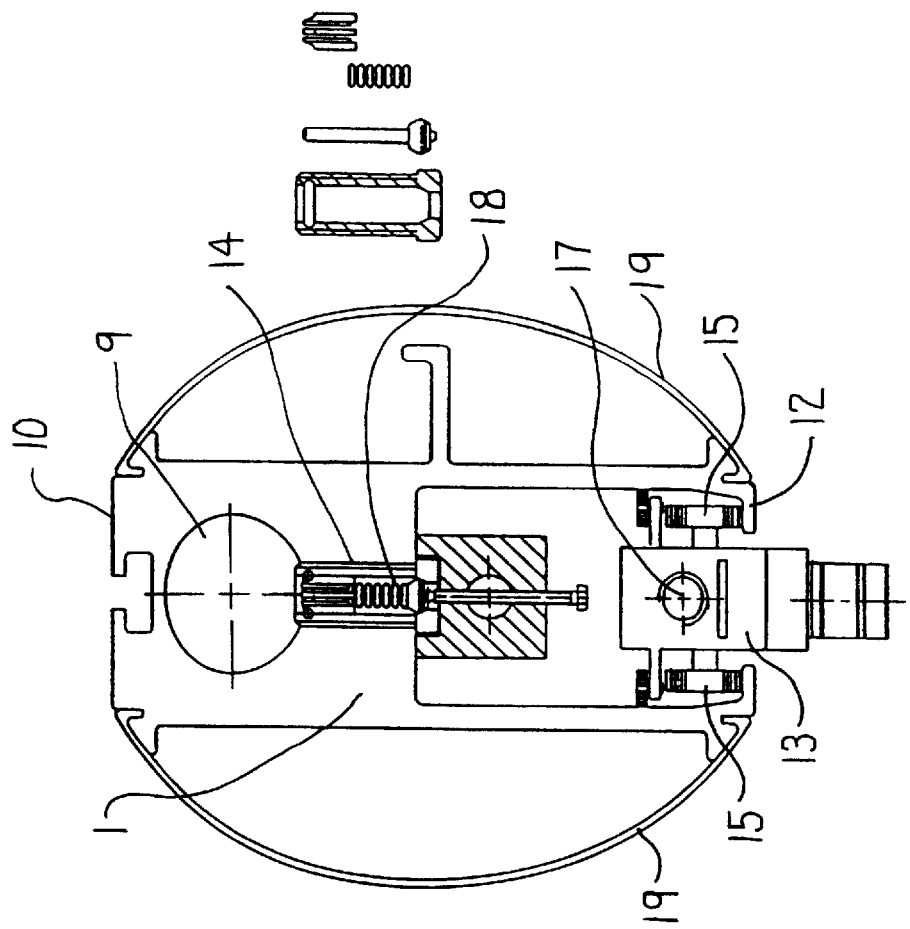
FIG. 3 is a cross-sectional view of the feeding module illustrated in FIG. 1 in the area of the removal branch.
Figure 2:
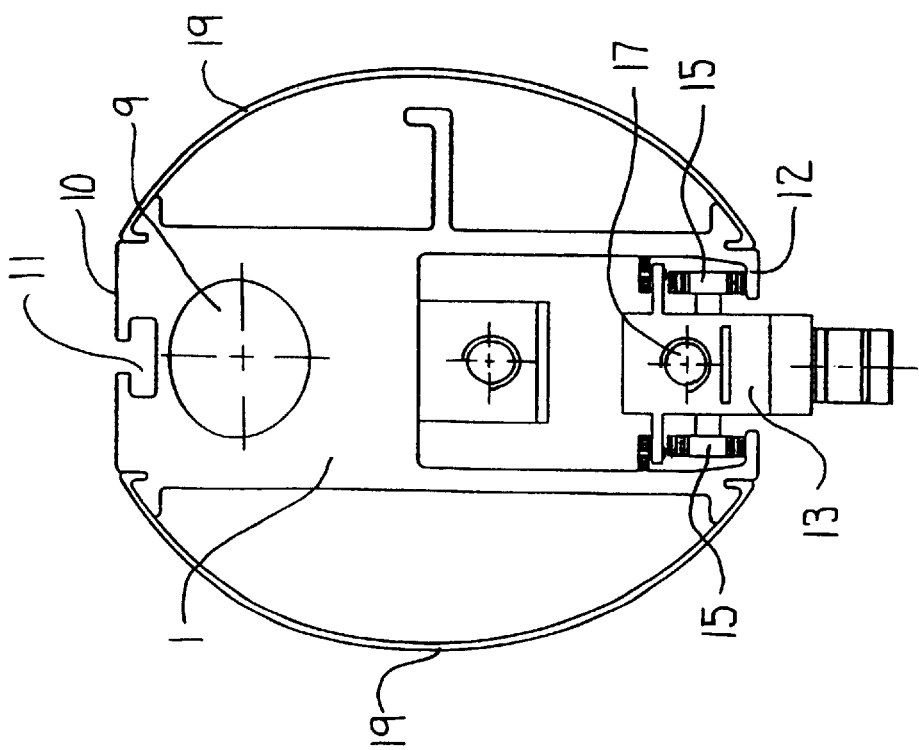
FIG. 2 is a cross-sectional view of the feeding module illustrated in FIG. 1 in the area of the flexible energy chain.

The work station feeding module illustrated in FIGS. 1 to 3 has a rail 1, which has an essentially C-shaped (inverted U-shape) profile. This can best be seen in FIGS. 2 and 3. The rail 1 has an upper side 10 and an under side 12 and two outer sides, whereby a slot opens through the under side 12 and extending lengthwise along the rail 1. The rail 1 has another slot 11 in its upper side, which slot can be moved onto a retaining rail mounted on the ceiling of a room or on a frame. Semicylindrical shaped covers 19 are respectively mounted on the right and left outer sides of the rail 1 so that a cavity is created between the insides of the covers 19 and the respective outer sides of the rail 1.

An elongate, flexible energy chain 4 is positioned within the rail 1, which can best be seen in FIG. 1 positioned in the slot. One end 5 of this flexible energy chain 4 is fixed within the rail 1. Starting from here, the upper chain strand of the flexible energy chain 4 extends in the slot along the interior upper side of the slot in the rail 1. This is followed by a 180° bend of the flexible energy chain 4 which is thereafter followed by the lower chain strand of the energy chain extending along the interior lower side of the slot adjacent under side 12 of the rail 1 parallel to the upper chain strand ending at the other end 6 of the energy chain 4.

The energy chain 4 is known and preferably consists of individual plastic members (links), which are hingedly connected with one another and form an inner channel receiving the lines therein as discussed in greater detail below.

A carriage 2 can be moved on the rail 1 by two undercarriages 13. The two undercarriages 13 are provided inside of the rail 1 (in the slot) and each have two coaxial rollers 15, which roll along on the interior facing portion of under side 12 of the rail 1, namely on the left and right of the longitudinal slot.

The undercarriages 13 have each a carrier, which extends downwardly through the slot of the rail 1. Both carriers are supported together on the actual carriage 2. The actual carriage 2 is essentially a connecting piece 16, which extends between the two carriers, and on which the output devices are arranged, to which the supply lines lead.

The supply lines in the illustrated exemplary embodiment comprise a compressed-air line 3 and an electrical line 8 and are guided within the flexible energy chain. The electrical line 8 extends within the cavity, which is formed between the inside of the cover 19 and the outside of the rail 1, and is fed to the inside of the rail 1 at a point not illustrated. The electric line 8 extends freely within the rail or is mounted on an interior surface of the rail 1 (on the left side in FIG. 1) until it enters at the rail-fixed fixation of the flexible energy chain (at reference numeral 5) into the flexible energy chain 4.

A continuous compressed-air channel 9 extends in the longitudinal direction within the rail above the energy chain 4. The compressed-air channel 9 is constructed as a bore in the raw material of the rail 1. Starting out from an output branch (tap) 14 of the compressed-air channel 9 to which the line 3 is gas sealingly connected, the compressed-air line 3 is guided into the rail-fixed fixation of the flexible energy chain at (reference numeral 5), where it enters into the flexible energy chain 4. The electrical line 8 and the compressed-air line 3 extend from there (here no longer illustrated) side-by-side in the hollow interior energy chain 4 through its upper chain strand, the bend and its lower chain strand to the undercarriage 13. The carrier of this undercarriage has through-holes 17 on the inside, through which extend the supply lines 3 or 8 up to the output devices, whereby only a compressed-air removal connection 7 is provided, on which a compressed-air spiral hose 20 can be mounted. Sockets are also provided for the electrical lines 8. A balancer 21 is provided to balance possibly occurring torques.

The continuous compressed-air channel 9 can in a further, here not illustrated, exemplary embodiment also extend in the longitudinal direction below or next to the energy chain 4. A further, not illustrated, exemplary embodiment provides that the compressed-air channel is formed by a pipe, which extends in a longitudinal direction or also in a transverse direction.

It is possible according to the invention that one or several compressed-air supply lines 3 and also one or several electric lines 8 and further supply lines, for example gas, or fluid supply lines are fed to the carriage 2 movable on the rail 1. In order to check the state of the supply lines, measuring devices, as for example compressed-air manometers or flow measuring devices, are provided on the carriage 2 or in the area of the output branches 14.

Figure 4:
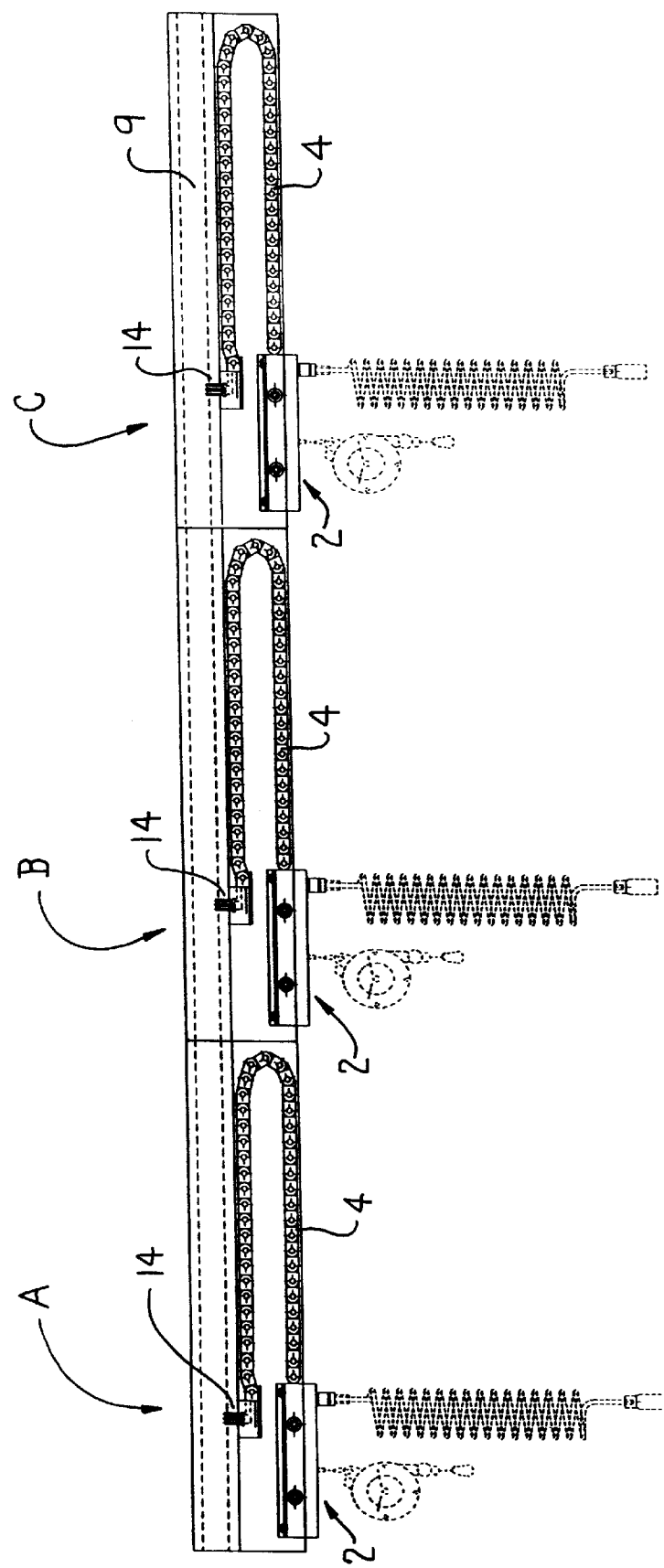
FIG. 4 is a longitudinal cross-sectional view of a work station feeding device of the invention, which includes three feeding modules of FIG. 1.

It is possible according to the invention, as shown in FIG. 4, to line up (connect in series) several of these work station feeding modules A, B, C of the above-described type along their longitudinal direction such that they form a common continuous compressed-air channel 9, from which the individual feeding modules are supplied with compressed air. The compressed-air channel 9 includes several output branches 14 as shown in FIG. 4. The compressed-air removal from the compressed-air channel 9 occurs preferably through a check valve 18 mounted in the removal branches 14.

Such a work station feeding device makes it unnecessary to have further feeding devices available at the work station, for example compressed-air and liquid supply bottles. Both electrical energy, as well as data, and compressed-air and gas and liquid can be supplied centrally through the work station feeding device.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. A work station feeding module with a rail, a carriage guided thereon and movable along the rail, and at least one supply line, guided in a flexible energy supply chain arranged within the rail, whereby one end of the flexible energy supply chain is fixed with respect to the rail and the other end is fastened on the carriage, the at least one supply line comprising a compressed-air line, a compressed-air outlet connection is provided on the carriage, and the rail includes a continuous compressed-air channel in its longitudinal direction, the channel being connected to the rail-fixed end of the compressed-air line through an output branch.

2. The work station feeding module according to claim 1, wherein the compressed-air channel includes several output branches, each connected to additional compressed-air lines.

3. The work station feeding module according to claim 2, wherein the output branches each include a check valve.

4. The work station feeding module according to claim 1, wherein the supply line includes an electric line.

5. The work station feeding module according to claim 1, wherein the supply line includes a line supplying liquid.

6. The work station feeding module according to claim 1, wherein the supply line includes a line supplying gas.

7. The work station feeding module according to claim 1, wherein the carriage includes a compressed-air manometer.

8. The work station feeding module according to claim 1, wherein a flow measuring device is provided on the carriage or on the output branch.

9. The work station feeding module according to claim 1, wherein the rail includes a fastening device on its upper side for mounting of the rail.

10. The work station feeding module according to claim 1, wherein the rail includes an essentially C-shaped profile, which is open at the under side of said rail, and the carriage includes at least one undercarriage, which rolls along on an interior under side of the rail on which the carriage is suspended.

11. A work station feeding device composed of a plurality of work station feeding modules according to claim 1, wherein the individual modules are arranged lengthwise one behind the other in order to form one single continuous compressed-air channel.

12. A work station feeding module comprising:

a rail;

a carriage guided thereon and movable along the rail;

an energy supply device arranged within the rail and having one end fixed with respect to the rail and the other end secured to the carriage;

at least one supply line guided in the energy supply device;

an outlet connection on the carriage; and a continuous channel connected to the rail-fixed end of the supply device through an output branch.

13. The work station feeding module of claim 12, wherein the energy supply device comprises a flexible energy supply chain.

14. The work station feeding module of claim 12, wherein the channel comprises a compressed-air channel and the supply line comprises a compressed air supply line.

15. The work station feeding module of claim 12, wherein the at least one supply line includes an electric line.

16. The work station of claim 12, wherein the at least one supply line includes a gas line.

17. The work station of claim 12, wherein the at least one supply line includes a liquid line.

18. The work station of claim 14, wherein a flow measuring device is provided on the carriage or on the output branch.

19. The work station of claim 12, wherein the continuous channel in its longitudinal direction extends through and along the length of said rail.

20. The work station of claim 12, wherein the rail has an essentially C-shaped profile open at the under side of said rail.

* * * * *